US011107216B2

(12) United States Patent
Barbash

(10) Patent No.: US 11,107,216 B2
(45) Date of Patent: Aug. 31, 2021

(54) SYSTEM AND METHOD FOR MICROSCOPIC IMAGE PROCESSING AND DETERMINING MYELINATION STATUS USING PROCESSED IMAGES

(71) Applicant: The Joan and Irwin Jacobs Technion-Cornell Institute, New York, NY (US)

(72) Inventor: Shahar Barbash, New York, NY (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 139 days.

(21) Appl. No.: 16/739,693

(22) Filed: Jan. 10, 2020

(65) Prior Publication Data

US 2020/0234438 A1    Jul. 23, 2020

Related U.S. Application Data

(60) Provisional application No. 62/794,006, filed on Jan. 18, 2019.

(51) Int. Cl.
*G06K 9/46* (2006.01)
*G06T 7/00* (2017.01)
*G06T 7/55* (2017.01)
*G06N 3/063* (2006.01)
*G06T 7/136* (2017.01)

(52) U.S. Cl.
CPC ........... *G06T 7/0012* (2013.01); *G06N 3/063* (2013.01); *G06T 7/136* (2017.01); *G06T 7/55* (2017.01); *G06T 2200/24* (2013.01); *G06T 2200/28* (2013.01)

(58) Field of Classification Search
CPC .... G06K 9/0012; G06K 9/00134; G06K 9/32; G06K 9/0014; G06T 7/0014; G06T 2207/20081; G06T 7/0012; G06T 7/55; G06T 2200/24; G06T 7/136; G06T 2200/28; G06N 3/063
See application file for complete search history.

(56) References Cited

U.S. PATENT DOCUMENTS

2016/0066789 A1* 3/2016 Rogers .................... A61N 1/05
    604/20
2018/0293456 A1* 10/2018 Bredno .................... G06K 9/34

* cited by examiner

*Primary Examiner* — Phuoc H Doan
(74) *Attorney, Agent, or Firm* — M&B IP Analysts, LLC

(57) ABSTRACT

A system and method for microscopic image processing. The method includes cleaning leaks shown in images to create cleaned images, each of the images having a neuron signal intensity, wherein the images include at least one neuron channel image and at least one oligodendrocyte channel image, wherein cleaning the images further includes applying a filtering function to each of the images and adjusting the neuron signal intensity of each of the images based on an output of the filtering function; detecting oligodendrocytes in the cleaned images, wherein each detected oligodendrocyte is a region of the images including an object for which the neuron signal intensity is within a range of neuron signal intensities; and identifying high-intensity sub-regions within each detected oligodendrocyte, wherein each high-intensity sub-region includes at least one high-intensity object, wherein each high-intensity object is an object for which the neuron signal intensity is above a threshold.

19 Claims, 4 Drawing Sheets

SYSTEM AND METHOD FOR MICROSCOPIC IMAGE PROCESSING AND DETERMINING MYELINATION STATUS USING PROCESSED IMAGES

CROSS-REFERENCE TO RELATED APPLICATIONS

This application claims the benefit of U.S. Provisional Application No. 62/794,006 filed on Jan. 18, 2019, the contents of which are hereby incorporated by reference.

TECHNICAL FIELD

The present disclosure relates generally to microscopic image processing, and more specifically to enhancing microscopic images.

BACKGROUND

Due to developments in microscopy automation, large amounts of high-quality images are now collected for research and diagnostic purposes. However, analyzing these images to extract meaningful insights has become a research bottleneck. Specifically, the high number of images typically must be viewed individually by a researcher or doctor, who proceeds to make a subjective determination of myelination status.

Microscopic images may be used to view effects of myelin. Myelin is a fatty substance formed in the central nervous system by glial cells called oligodendrocytes. Myelin insulates the axons of nerve cells in order to increase the speed at which electrical impulses propagate. Myelination is a cellular process in which an oligodendrocyte wraps its membrane around projections of nearby neurons and synthesizes myelin, thereby creating the insulated neuron. Demyelination occurs when myelination is interrupted during development and results in the loss of the myelin sheath insulating the nerves. Results of demyelination include several incurable neurodegenerative diseases, such as Alzheimer's disease, Parkinson's disease, and multiple sclerosis.

Existing solutions for measuring myelination include viewing images captured by microscopes. This process requires manual viewing that is costly, time consuming, and subject to human error. Specifically, the observer must make a subjective judgment of whether the images show notable demyelination and to what extent. Although quantitative techniques for measuring myelination have been developed, these techniques face challenges with respect to accuracy due, in part, to image-based errors. Additionally, existing solutions face challenges in processing high numbers of images such that they are not suitable for large scale use.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for microscopic image processing. The method comprises: cleaning a plurality of leaks shown in a plurality of images to create a plurality of cleaned images, each of the plurality of images having a neuron signal intensity, wherein the plurality of images includes at least one neuron channel image and at least one oligodendrocyte channel image, wherein cleaning the plurality of images further comprises applying a filtering function to each of the plurality of images and adjusting the neuron signal intensity of each of the plurality of images based on an output of the filtering function; detecting a plurality of oligodendrocytes in the plurality of cleaned images, wherein each detected oligodendrocyte is a region of the plurality of images including an object of a plurality of objects shown in the plurality of images for which the neuron signal intensity is within a range of neuron signal intensities; and identifying a plurality of high-intensity sub-regions within each detected oligodendrocyte, wherein each high-intensity sub-region includes at least one high-intensity object, wherein each high-intensity object is an object of the plurality of objects for which the neuron signal intensity is above a threshold.

Certain embodiments disclosed herein also include a non-transitory computer readable medium having stored thereon causing a processing circuitry to execute a process, the process comprising: cleaning a plurality of leaks shown in a plurality of images to create a plurality of cleaned images, each of the plurality of images having a neuron signal intensity, wherein the plurality of images includes at least one neuron channel image and at least one oligodendrocyte channel image, wherein cleaning the plurality of images further comprises applying a filtering function to each of the plurality of images and adjusting the neuron signal intensity of each of the plurality of images based on an output of the filtering function; detecting a plurality of oligodendrocytes in the plurality of cleaned images, wherein each detected oligodendrocyte is a region of the plurality of images including an object of a plurality of objects shown in the plurality of images for which the neuron signal intensity is within a range of neuron signal intensities; and identifying a plurality of high-intensity sub-regions within each detected oligodendrocyte, wherein each high-intensity sub-region includes at least one high-intensity object, wherein each high-intensity object is an object of the plurality of objects for which the neuron signal intensity is above a threshold.

Certain embodiments disclosed herein also include a system for microscopic image processing. The system comprises: a processing circuitry; and a memory, the memory containing instructions that, when executed by the processing circuitry, configure the system to: clean a plurality of leaks shown in a plurality of images to create a plurality of cleaned images, each of the plurality of images having a neuron signal intensity, wherein the plurality of images includes at least one neuron channel image and at least one oligodendrocyte channel image, wherein cleaning the plurality of images further comprises applying a filtering function to each of the plurality of images and adjusting the neuron signal intensity of each of the plurality of images based on an output of the filtering function; detecting a plurality of oligodendrocytes in the plurality of cleaned images, wherein each detected oligodendrocyte is a region of the plurality of images including an object of a plurality of objects shown in the plurality of images for which the neuron signal intensity is within a range of neuron signal intensities; and identify a plurality of high-intensity sub-regions within each detected oligodendrocyte, wherein each high-intensity sub-region includes at least one high-intensity object, wherein each high-intensity object is an object of the plurality of objects for which the neuron signal intensity is above a threshold.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
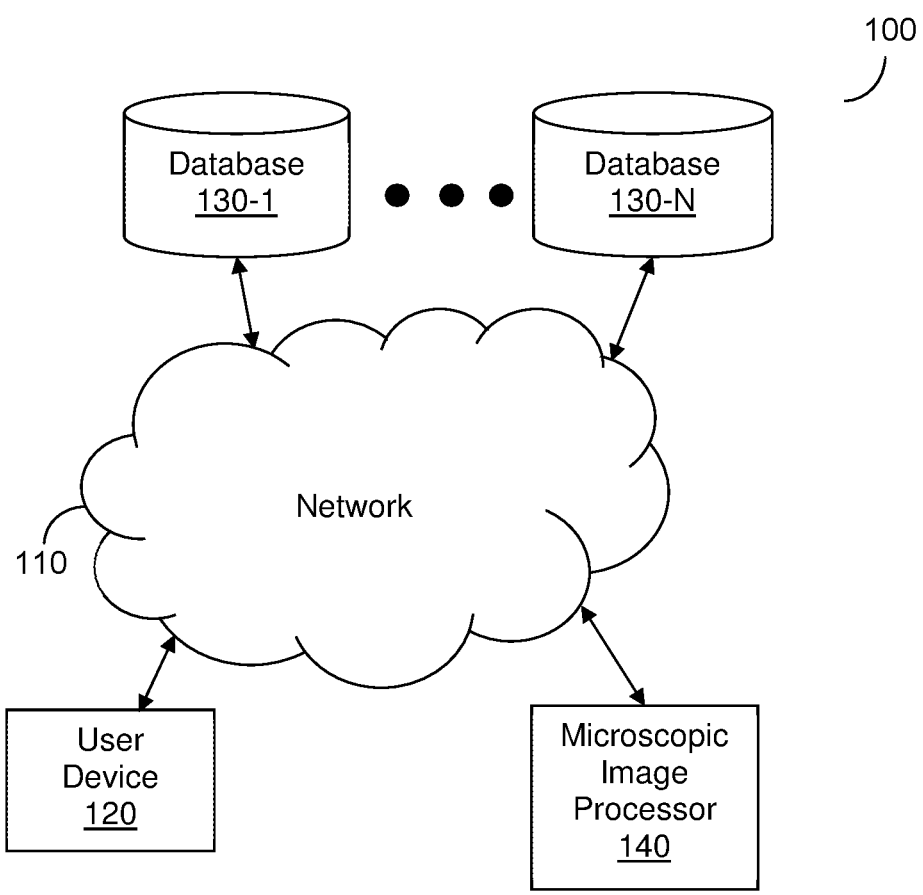
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for microscopic image processing. The disclosed embodiments provide image processing techniques that improve images to be analyzed for myelination status of cells shown therein and, more specifically, allow for more efficient and accurate determination of myelination status than existing solutions. The analysis and determination of myelination status is performed using image recognition techniques. The disclosed embodiments further provide techniques for determining myelination status based on images processed as described herein.

Overlapping microscopic images, each corresponding to one of two types of cells, are received. The cells may be stained to highlight such channels. The disclosed embodiments allow for processing microscopic images stained using any of these molecular stains. The microscopic images include neuron-specific images of a neuron channel and oligodendrocyte-specific images of an oligodendrocyte channel. The images may be preprocessed by filtering out noisy images (i.e., images demonstrating a measure of noise above a threshold), performing contrast stretching on each image to bring the general neuron signal intensity distribution across images closer together, and the like. Artifacts in the images such as neuron cell aggregates and dust specks demonstrating image erosion may be excluded from analysis.

The images are cleaned by adjusting neuron signal intensities to clean leaks between the neuron channel and the oligodendrocyte channel (i.e., leaks from the neuron channel into the oligodendrocyte channel and vice-versa). In some implementations, some pairs of neuron channel and oligodendrocyte channel images may be ignored during subsequent processing as determined based on local spatial correlations between each neuron channel image and its corresponding oligodendrocyte channel image.

Regions showing oligodendrocytes are detected in the cleaned images. Oligodendrocytes are detected by applying one or more intensity thresholds, for example, beginning at the $20^{th}$ percentile of neuron intensity and increasing up to the $80^{th}$ percentile of neuron intensity. In each step, binary images are produced by applying the current intensity threshold to the cleaned images and filtering out objects smaller than a predetermined size threshold. The threshold with the highest number of identified objects (i.e. cells) is selected. In an example implementation, this procedure yield on average 5-8 objects per image, which corresponds with the average number of observed oligodendrocytes per image.

Based on the detected regions, sub-regions including portions of oligodendrocytes that are co-localized with respective neurons are identified. Such sub-regions are portions of the detected regions exhibiting high intensities of neuron signals. In an embodiment, the identified sub-regions exhibit at or above the $80^{th}$ percentile of neuron signal intensity. In other embodiments, different percentiles may be utilized. As a result, for each detected oligodendrocyte region, sub-regions representing myelinating portions of those cells are detected.

The identified sub-regions represent myelinating parts of oligodendrocytes and may be utilized to determine myelination status. To this end, a myelination index may be calculated as the ratio between area of the sub-regions having high neuron signal intensities and a total area of the oligodendrocytes in the detected regions.

The image processing according to the disclosed embodiments allows for automating determination of myelination status based on images of oligodendrocytes and neurons while providing accuracy that is at least comparable to manual scoring. Further, the myelination status determined as described herein uses objective factors for analyzing images and calculating myelination that lead to higher consistency among results as compared to subjective manual estimations and calculations based thereon.

FIG. 1 shows an example network diagram 100 utilized to describe the various disclosed embodiments. In the example network diagram 100, a user device 120, a plurality of data sources 130-1 through 130-N (hereinafter referred to individually as a data source 130 and collectively as data sources 130, merely for simplicity purposes), and a microscopic image processor 140 are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device configured for receiving and displaying data such as images, myelination indices, and the like. In various implementations, the user device 120 may be configured to display a graphical user interface (GUI) including the images, myelination indices, and other information. The GUI may further allow for a user to interact with a displayed image using functions such as, but not limited to, zooming in, zooming out, dragging the image, looking at specific cells in a multi-cell image as well as their respective myelination indices, manually adding scores for images (e.g., for comparison to myelination indices determined as described herein or otherwise for marking myelination indices based on the processed images), inputting experimental conditions for secondary statistical analysis based on the processed images, and the like.

The data sources may include, but are not limited to, databases or other sources of image data. The data sources 130 store microscopic images showing cells including neurons and oligodendrocytes. In an example implementation, the microscopic images may show neurons and oligodendrocytes stained using cell-specific molecular stains that aid in capturing microscopic details. The images may be overlapping images captured at different wavelengths. The microscopic images are received or retrieved from the data sources 130 by the microscopic image processor 140.

The microscopic image processor 140 is configured to process microscopic images showing neurons and oligodendrocytes as described herein. To this end, the microscopic image processor 140 is configured to, for example, preprocess the images (e.g., by filtering out noisy images and performing contrast stretching), remove artifacts, and clean leaks. The microscopic image processor 140 may be further configured to detect the oligodendrocytes and sub-regions of those cells having high neuron signal intensity based on the processed images and to determine a myelination status based on the ratio between the area of the sub-regions and the total area of the oligodendrocytes. The microscopic image process 140 may further be configured to send the processed microscopic images, the determined myelination status, both, and the like, to the user device 120 for display.

Figure 2:
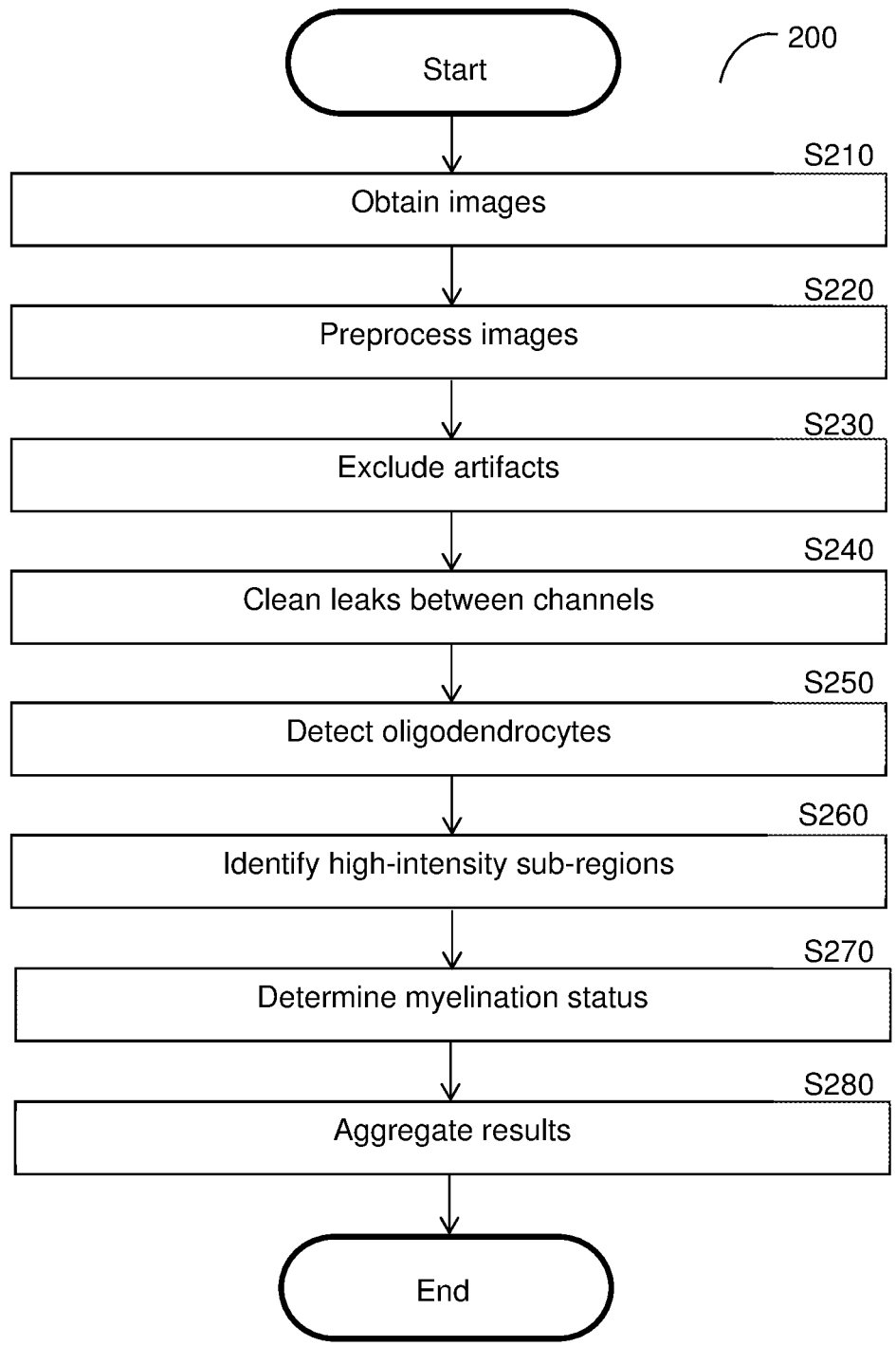
FIG. 2 is a flowchart illustrating a method for processing microscopic images according to an embodiment.

FIG. 2 is an example flowchart 200 illustrating a method for image processing and myelination determination according to an embodiment. In an embodiment, the method is performed by the microscopic image processor 140. In another embodiment, at least a part of the method may be performed by another system. For example, microscopic images may be processed according to the method and sent to another system for myelination status determination.

At S210, microscopic images are obtained from one or more data sources. The microscopic images may be, for example, received or retrieved from one or more databases (e.g., one or more of the databases 130, FIG. 1).

The obtained microscopic images include neuron channel images showing neurons and oligodendrocyte channel images showing oligodendrocytes. Each cell type may be stained using a different molecule such that the stains used for neurons are visually distinct from the stains of oligodendrocytes. The fluorescent emission of each type of stain may be captured via a microscope as two channels. The stains are captured in the respective cells. Both types of cells are captured in the same microscope view such that they may overlap.

At optional S220, the images may be preprocessed to improve accuracy of subsequent steps. In an embodiment, S220 includes removing noisy images, performing contrast stretching, or both. The noise of each of the images may be measured, for example, using salt and pepper noise estimation. The contrast stretching is performed such that the general neuron signal intensity distribution of neuron intensities among different images are closer together.

At optional S230, artifacts may be excluded from the images. The excluded artifacts shown in the images are not analyzed during subsequent processing. Because the artifacts are irrelevant regions, excluding the artifacts from subsequent processing including determining myelination status improves accuracy of that determination. In an embodiment, each artifact is ignored when cleaning and detecting oligodendrocytes such that the detected oligodendrocytes do not include the artifacts.

In an embodiment, the types of artifacts excluded are cell aggregates, dust specks, or both. Cell aggregates exhibit relatively high local neuron signal intensity levels that obscure cellular details. In an example implementation, cell aggregates may be identified by applying an image erosion operation with a circle having a diameter of 60 pixels. Dust specks are shown in the microscopic images as bright circular objects. In an example implementation, dust specks are identified by measuring the circularity of each object shown in the images and identifying objects having a circularity above a threshold (e.g., 0.9).

At S240, leaks in the microscopic images are cleaned. The leaks are objects shown in the microscopic images that do not represent their respective channels. Each channel represents a wavelength range in which one or more of the microscopic images was captured. In an example implementation, the leaks are corrected using a wide Gaussian filtration. In an embodiment, neuron signal intensity levels of objects are adjusted, thereby increasing the accuracy of subsequent steps. In some implementations, some of the images may be excluded from subsequent steps based on local spatial correlations between neuron channel images and corresponding oligodendrocyte channel images. Cleaning leaks in microscopic images is described further herein below with respect to FIG. 3.

At S250, oligodendrocytes are detected in the cleaned images. In an embodiment, S250 includes identifying regions of the cleaned images showing objects having a neuron signal intensity within a predetermined range with respect to neuron signal intensities and determining binary objects having above a threshold size with respect to average oligodendrocyte size. The neuron signal intensity, also referred to as neuron channel intensity or neuron intensity, may be determined based on fluorescent emission intensity of the stained cells. In each image, objects identified based on application of the threshold that yields the highest number of objects meeting a predetermined object size threshold are detected as oligodendrocytes.

Only considering binary objects above a threshold size relative to the average oligodendrocyte size removes the need to process portions of the image showing objects that are too small to likely be oligodendrocytes.

At S260, high-intensity sub-regions are identified within the detected oligodendrocytes. The high-intensity sub-regions are sub-regions of the detected oligodendrocytes showing objects having a neuron signal intensity above a threshold. These sub-regions represent myelinating parts of an oligodendrocyte. In an example implementation, the threshold is 80% of the highest neuron signal intensity shown in the microscopic images.

At optional S270, a myelination status is determined based on the collective area of the high-intensity sub-regions and the collective area of the detected oligodendrocytes. Specifically, the myelination status is represented by a myelination index calculated as the ratio of the sub-region area to the total oligodendrocyte area. To this end, S270 may further include analyzing the respective portions of the microscopic images showing the sub-regions and the detected oligodendrocytes to determine their respective areas (e.g., as expressed in numbers of pixels included in each respective portion). Due to the processing in the previous steps, the myelination status may be determined automatically while maintaining accuracy that is at least comparable as compared to manual estimations based on unprocessed images.

At optional S280, the determined myelination status is aggregated with myelination statuses of other microscopic images in order to provide multi-sample statistics. To this end, in an embodiment, S280 includes iteratively performing steps S210 through S270 to determine myelination status for each set of one or more other microscopic images. Based on the multiple myelination statuses, multi-sample statistics are determined. The multi-sample statistics may be utilized to create a graph and to provide the graph for display, for example, to a user device (e.g., the user device 120, FIG. 1).

In an example implementation, the sets of microscopic images may show different cells across a microscope plate or portion thereof. More specifically, a set of microscopic images may include images showing cells in a well of a microscope plate. In some implementations, results of processing images of cells in different wells of the microscope plate as described herein may be compared in order to determine cross-well statistics for the same experiment.

It should be noted that the steps are shown in a particular order in FIG. 2 merely for example purposes, and that at least some steps may be in a different order without departing from the scope of the disclosed embodiments. In particular, the artifact exclusion may be performed any time before myelination status determination, for example after the sub-regions are identified.

Figure 3:
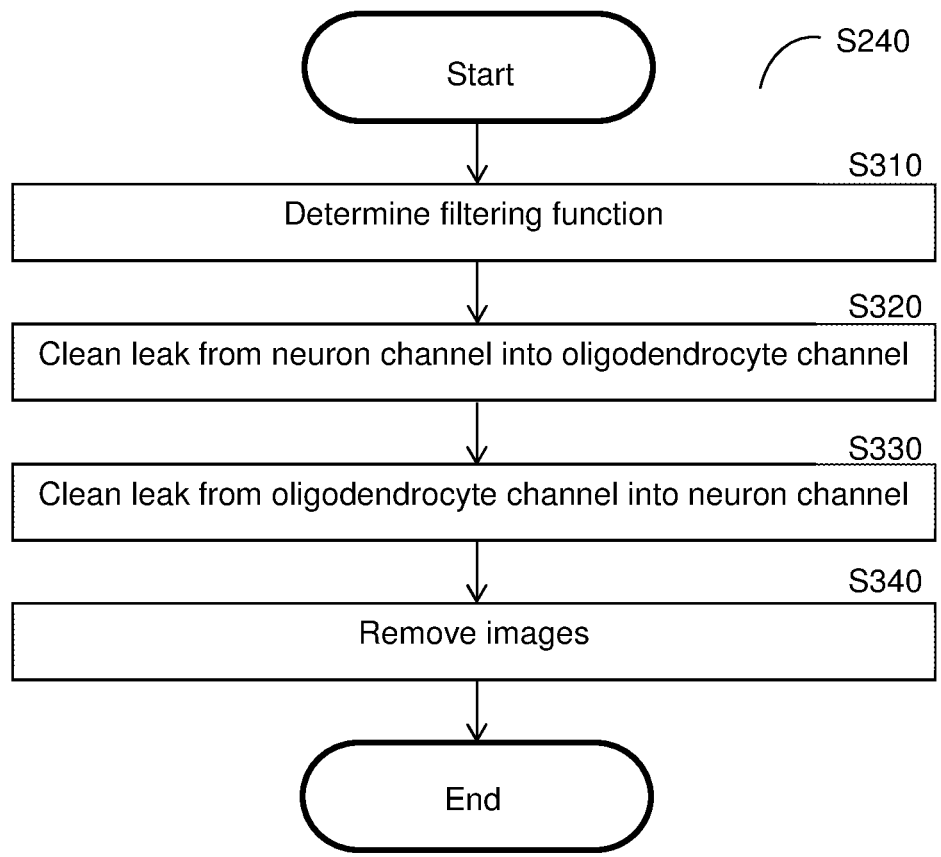
FIG. 3 is a flowchart illustrating a method for cleaning portions of microscopic images showing leaks between channels in different types of cells according to an embodiment.

FIG. 3 is an example flowchart S240 illustrating a method for cleaning portions of images showing leaks between oligodendrocyte and neuron channels according to an embodiment.

At S310, a filtering function to be applied to the microscopic images is determined. In an embodiment, the filtering function is a wide Gaussian filter. The parameters for the filtering function and, specifically, the size used for the filtering, are based on a predetermined average size (e.g., average horizontal and vertical lengths or average radius) of oligodendrocytes. To this end, in an embodiment, the size used for the filtering is the size of the average oligodendrocyte cell or approximately that size. In an example implementation, the predetermined average size may be determined in a naive manner based on the pre-filtered microscopic images. To this end, in a further example, the filtering function is applied to each pre-filtered microscopic image or a portion thereof based on application of the threshold that yields the highest number of objects meeting a predetermined object size threshold.

At S320, leakage from the neuron channel into the oligodendrocyte channel is cleaned. This leakage introduces linear objects that are far away from a body of one or more neurons. In an embodiment, S320 includes applying the filtering function to each oligodendrocyte channel image and adjusting oligodendrocyte signal intensities based on the result. More specifically, a respective oligodendrocyte channel filtering output is obtained for each oligodendrocyte channel image by applying the filtering function to the image. For each oligodendrocyte channel image, a matrix representing the respective oligodendrocyte channel filter output is added to a matrix representing the original oligodendrocyte channel image (i.e., the image before the filtering function was applied), thereby resulting in a cleaned oligodendrocyte channel image.

At S330, leakage from the oligodendrocyte channel into the neuron channel is cleaned. This leakage introduces blob-like objects in the portions of the images showing one or more neurons. In an embodiment, S330 includes applying the filtering function to each oligodendrocyte channel image and adjusting neuron signal intensities based on the result. More specifically, a respective oligodendrocyte channel filtering output is obtained for each neuron channel image by applying the filtering function to the corresponding oligodendrocyte channel image. For each neuron channel image, a matrix representing the oligodendrocyte channel filter output of the respective oligodendrocyte channel image is subtracted from a matrix representing the original neuron channel image (i.e., the image before the filtering function was applied), thereby resulting in a cleaned neuron channel image.

At optional S340, one or more images may be removed such that they are excluded from subsequent processing (e.g., from subsequent steps in the method of FIG. 2).

In an embodiment, images showing dead cells or images exhibiting high leakage may be removed. Whether an image should be removed may be determined based on a local spatial correlation between the neuron and oligodendrocyte channels. To this end, leakage may be high when a local spatial correlation between the channels is above a threshold. As a non-limiting example, a Pearson correlation coefficient may be determined between each neuron channel image and corresponding oligodendrocyte channel image. Alternatively or collectively, local spatial correlations representing dead cells may be determined based on peaks of a distribution of local spatial correlations.

The threshold may be, for example, a predetermined threshold or a threshold selected by a user. To this end, in some implementations, S340 may include displaying distributions of the correlation coefficients to a user and receiving, via a user interface, inputs indicating which sets of neuron channel images and corresponding oligodendrocyte channel images to remove. Removing images based on local spatial correlation allows, for example, for removing dead cells. In this regard, it has been identified that dead cells typically exhibit a local spatial correlation that collectively form a second peak of a distribution with other local spatial correlation values. Thus, pairs of neuron channel and oligodendrocyte channel images showing dead cells may be identified and removed.

It should be noted that that the steps are shown in a particular order in FIG. 2 merely for example purposes, and that at least some steps may be in a different order without departing from the scope of the disclosed embodiments. In particular, step S330 may be performed before or in parallel with step S320 without departing from the scope of the disclosure.

Figure 4:
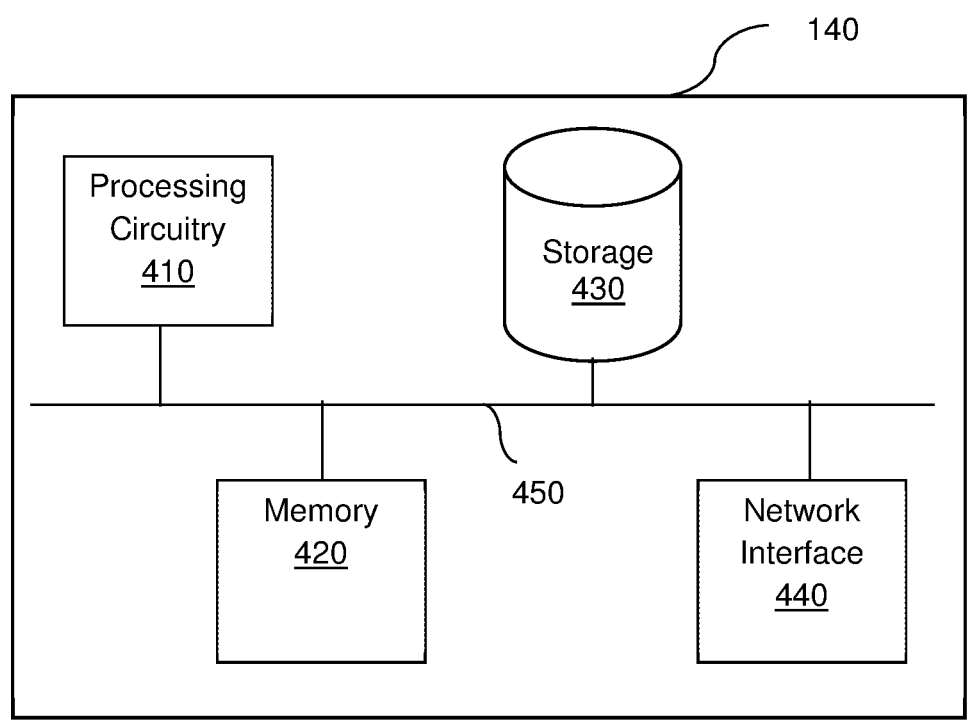
FIG. 4 is a schematic diagram of a microscopic image processor according to an embodiment.

FIG. 4 is an example schematic diagram of a microscopic image processor 140 according to an embodiment. The microscopic image processor 140 includes a processing circuitry 410 coupled to a memory 420, a storage 430, and a network interface 440. In an embodiment, the components of the microscopic image processor 140 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein. Specifically, the instructions, when executed, cause the processing circuitry 410 to generate fleet behavior models and detect anomalous behavior in fleets or sub-fleets as described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the microscopic image processor 140 to communicate with the database 140 for the purpose of, for example, retrieving microscopic images for processing. Further, the network interface 440 allows the microscopic image processor 140 to communicate with the user device 120 for the purpose of sending processed images, myelination indices determined based on processed images, both, and the like.

It should be understood that the embodiments described herein are not limited to the specific architecture illustrated in FIG. 4, and other architectures may be equally used without departing from the scope of the disclosed embodiments.

It should be noted that various disclosed embodiments are described with respect to microscopic images in order to describe images of objects such as cells that cannot be observed by the naked eye, but that the disclosed embodiments may be equally applicable to other images showing objects that cannot be observed by the naked eye regardless of whether such images are captured by a microscope.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for microscopic image processing, comprising:
    cleaning a plurality of leaks shown in a plurality of images to create a plurality of cleaned images, each of the plurality of images having a neuron signal intensity, wherein the plurality of images includes at least one neuron channel image and at least one oligodendrocyte channel image, wherein cleaning the plurality of images further comprises applying a filtering function to each of the plurality of images and adjusting the neuron signal intensity of each of the plurality of images based on an output of the filtering function;
    detecting a plurality of oligodendrocytes in the plurality of cleaned images, wherein each detected oligodendrocyte is a region of the plurality of images including an object of a plurality of objects shown in the plurality of images for which the neuron signal intensity is within a range of neuron signal intensities; and
    identifying a plurality of high-intensity sub-regions within each detected oligodendrocyte, wherein each high-intensity sub-region includes at least one high-intensity object, wherein each high-intensity object is an object of the plurality of objects for which the neuron signal intensity is above a threshold.

2. The method of claim 1, wherein the plurality of oligodendrocytes collectively has a first area, wherein the plurality of high-intensity sub-regions collectively has a second area, further comprising:
    determining a myelination status based on the first and second areas.

3. The method of claim 2, wherein determining the myelination status further comprises:
  determining a first number of pixels showing portions of the plurality of oligodendrocytes and a second number of pixels showing portions of the plurality of high-intensity sub-regions, wherein the first area is the first number of pixels, wherein the second area is the second number of pixels.

4. The method of claim 1, wherein adjusting the neuron signal intensity of each of the at least one oligodendrocyte channel image further comprises:
  adding a matrix representing the output of the filtering function when applied to the oligodendrocyte channel image to a matrix representing the oligodendrocyte channel image.

5. The method of claim 1, wherein each of the at least one neuron channel image corresponds to one of the at least one oligodendrocyte channel image, wherein adjusting the neuron signal intensity of each of the at least one neuron channel image further comprises:
  subtracting a matrix representing the output of the filtering function when applied to the corresponding oligodendrocyte channel image of the neuron channel image from a matrix representing the neuron channel image.

6. The method of claim 1, further comprising:
  determining at least one local spatial correlation for at least one pair of images, wherein each local spatial correlation is for a pair of images including a neuron channel image of the at least one neuron channel image and an oligodendrocyte channel image of the at least one oligodendrocyte channel image; and
  removing at least one of the at least one pair of images based on the at least one local spatial correlation.

7. The method of claim 1, further comprising:
  excluding at least one artifact of the plurality of objects from the cleaning.

8. The method of claim 7, wherein the at least one artifact includes at least one cell aggregate, further comprising:
  identifying the at least one cell aggregate by applying an image erosion operation with a circle having a predetermined diameter.

9. The method of claim 7, wherein the at least one artifact includes at least one dust speck, further comprising:
  identifying the at least one dust speck by measuring a circularity of each of a plurality of objects shown in the images, wherein each of the at least one artifact is one of the plurality of objects having a circularity above a threshold.

10. A non-transitory computer readable medium having stored thereon instructions for causing a processing circuitry to execute a process, the process comprising:
  cleaning a plurality of leaks shown in a plurality of images to create a plurality of cleaned images, each of the plurality of images having a neuron signal intensity, wherein the plurality of images includes at least one neuron channel image and at least one oligodendrocyte channel image, wherein cleaning the plurality of images further comprises applying a filtering function to each of the plurality of images and adjusting the neuron signal intensity of each of the plurality of images based on an output of the filtering function;
  detecting a plurality of oligodendrocytes in the plurality of cleaned images, wherein each detected oligodendrocyte is a region of the plurality of images including an object of a plurality of objects shown in the plurality of images for which the neuron signal intensity is within a range of neuron signal intensities; and
  identifying a plurality of high-intensity sub-regions within each detected oligodendrocyte, wherein each high-intensity sub-region includes at least one high-intensity object, wherein each high-intensity object is an object of the plurality of objects for which the neuron signal intensity is above a threshold.

11. A system for microscopic image processing, comprising:
  a processing circuitry; and
  a memory, the memory containing instructions that, when executed by the processing circuitry, configure the system to:
  clean a plurality of leaks shown in a plurality of images to create a plurality of cleaned images, each of the plurality of images having a neuron signal intensity, wherein the plurality of images includes at least one neuron channel image and at least one oligodendrocyte channel image, wherein cleaning the plurality of images further comprises applying a filtering function to each of the plurality of images and adjusting the neuron signal intensity of each of the plurality of images based on an output of the filtering function;
  detect a plurality of oligodendrocytes in the plurality of cleaned images, wherein each detected oligodendrocyte is a region of the plurality of images including an object of a plurality of objects shown in the plurality of images for which the neuron signal intensity is within a range of neuron signal intensities; and
  identify a plurality of high-intensity sub-regions within each detected oligodendrocyte, wherein each high-intensity sub-region includes at least one high-intensity object, wherein each high-intensity object is an object of the plurality of objects for which the neuron signal intensity is above a threshold.

12. The system of claim 11, wherein the plurality of oligodendrocytes collectively has a first area, wherein the plurality of high-intensity sub-regions collectively has a second area, wherein the system is further configured to:
  determine a myelination status based on the first and second areas.

13. The system of claim 12, wherein the system is further configured to:
  determine a first number of pixels showing portions of the plurality of oligodendrocytes and a second number of pixels showing portions of the plurality of high-intensity sub-regions, wherein the first area is the first number of pixels, wherein the second area is the second number of pixels.

14. The system of claim 11, wherein the system is further configured to:
  add a matrix representing the output of the filtering function when applied to the oligodendrocyte channel image to a matrix representing the oligodendrocyte channel image.

15. The system of claim 11, wherein each of the at least one neuron channel image corresponds to one of the at least one oligodendrocyte channel image, wherein the system is further configured to:
  subtract a matrix representing the output of the filtering function when applied to the corresponding oligodendrocyte channel image of the neuron channel image from a matrix representing the neuron channel image.

16. The system of claim 11, wherein the system is further configured to:
  determine at least one local spatial correlation for at least one pair of images, wherein each local spatial correlation is for a pair of images including a neuron channel image of the at least one neuron channel image and an oligodendrocyte channel image of the at least one oligodendrocyte channel image; and remove at least one of the at least one pair of images based on the at least one local spatial correlation.

17. The system of claim 11, wherein the system is further configured to:

exclude at least one artifact of the plurality of objects from the cleaning.

18. The system of claim 17, wherein the at least one artifact includes at least one cell aggregate, wherein the system is further configured to:

identify the at least one cell aggregate by applying an image erosion operation with a circle having a predetermined diameter.

19. The system of claim 17, wherein the at least one artifact includes at least one dust speck, wherein the system is further configured to:

identify the at least one dust speck by measuring a circularity of each of a plurality of objects shown in the images, wherein each of the at least one artifact is one of the plurality of objects having a circularity above a threshold.

* * * * *